Feb. 7, 1967 W. G. BROWN 3,303,285
COMMUNICATION SYSTEM FOR THE SELECTIVE TRANSMISSION OF SPEECH AND DATA
Filed May 29, 1963
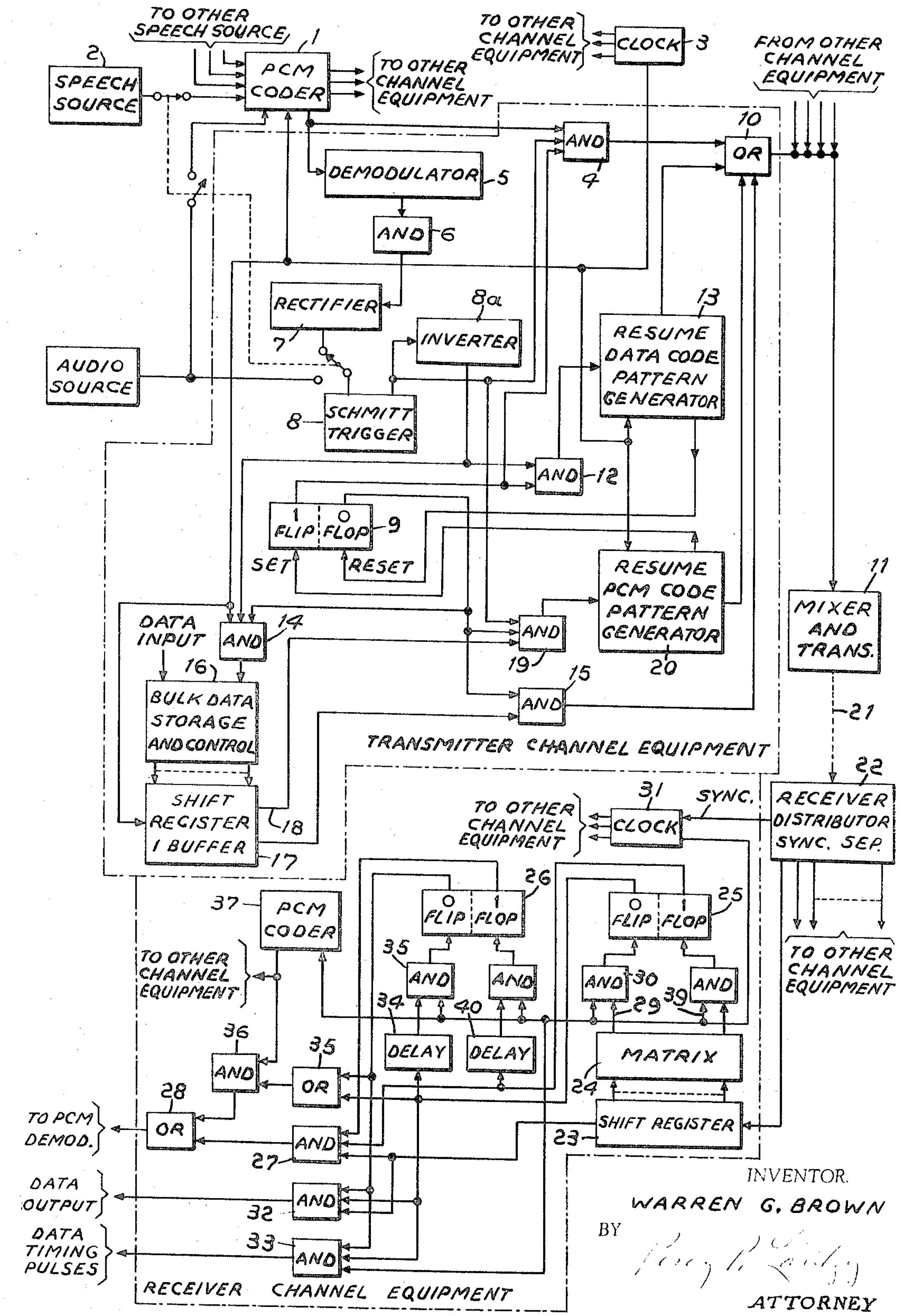
INVENTOR.
WARREN G. BROWN
BY
[signature]
ATTORNEY United States Patent Office 3,303,285

Patented Feb. 7, 1967

3,303,285

COMMUNICATION SYSTEM FOR THE SELECTIVE TRANSMISSION OF SPEECH AND DATA

Warren G. Brown, River Vale, N.J., assignor to International Telephone and Telegraph Corporation, Nutley, N.J., a corporation of Maryland Filed May 29, 1963, Ser. No. 284,163
17 Claims. (Cl. 179—15)

This invention relates to communication systems and more particularly to a communication system capable of interleaving with a first type of intelligence in digital form, such as speech, a second type of intelligence in digital form, such as data.

It is known that voice channels have idle periods during the conversation. The basic idea of this invention is to employ this idle time for the transmission of digital data information. It has been indicated that voice channels in PCM (pulse code modulation) form have about 50,000 bits per second capacity and are idle more than half the time during two-way conversations. Thus, it would be possible to provide 30,000 bits of data information interleaved into the conversation with no significant effect on the voice channel. The outstanding advantage of this mode of operation is that the data is not real time, that is, not transmitted in a particular time slot of a time division multiplex pulse train and, therefore, a relatively small group or even a single PCM voice channel can be shared.

It has been proposed in the past to transmit data over voice channels by scanning a large number of channels in a time division multiplex signal and coupling the data to a channel that is now vacant. This arrangement depends on having a statistically large number of voice channels so that the probability of all the channels being active at once can be ignored. This becomes more risky as the number of multiplex channels is decreased, since the probability of a single channel being busy all the time is very large on a time sharing basis and, thus, the possibility of transmitting data on this single voice channel is almost nil. The risk is nonexistent when the alternate traffic, the data traffic, is not a real time service. There is a tremendous potential transmission capacity made available in such an arrangement, perhaps 50,000 words per minute, along with each voice channel.

Such a system based on inserting the data information in the idle time of a voice channel has been previously proposed. However, in this previous arrangement the first digit of each code group of the data information and the first digit of each code group of the voice information was a predetermined digit (0 for one type of information and 1 for the other type of information) and could not vary from this, this being employed to enable the receiver to tell whether it is receiving the data information or voice information. It is obvious that this will restrict the number of amplitude levels that can be transmitted by a code having a given number of digits, or to retain this same number of levels will require an additional digit for each code group for identification purposes, thereby increasing the transmission bandwidth requirements. Also, the circuitry recognizing the absence or lulls in the conversation on the voice channel responds to the particular code group representing no voice.

An object of this invention is to incorporate the techniques of the previous arrangement, namely, that of interleaving a second type of intelligence, such as data information, in the idle periods of a channel carrying a first type of intelligence, such as speech, without restricting the number of amplitude levels capable of being transmitted by a code having a given number of digits per code group.

A feature of this invention is to provide a monitor operating to (1) detect a minimum level of the first type of intelligence, (2) to send a special code sequence when a gap is detected to alert the receiver to accept a second type of intelligence, (3) to send the second type of intelligence while still monitoring the first type of intelligence, (4) to send an interrupt code when the first type of intelligence resumes, and (5) to enable the transmission of the first type of intelligence over the channel.

Another feature of this invention is the provision of a communication channel for transmitting a first type of intelligence in the form of digital code groups, means coupled to the channel to detect idle intervals in the first type of intelligence, means responsive to the output of the means to detect to couple a second type of intelligence in digital form to the communication channel during the idle intervals, and means coupled to the output of the channel responsive to the second type of intelligence to control the coupling of the first type of intelligence and the second type of intelligence to their appropriate utilization devices.

Still another feature of this invention is the provision of a source of code characters representing the second type of intelligence which includes a source of message characters, a first generator to produce a first predetermined code pattern to identify the beginning of the idle interval of the first type of intelligence, and a second generator to produce a second predetermined code pattern to identify the end of the idle interval.

A further feature of this invention is the provision in the receiver of a first logic circuit arrangement coupled to the arrangement to detect the above-mentioned first code pattern to connect a first output to the storage means into which the received signals have been placed so that the coded second type of intelligence may be coupled to its appropriate utilization device and a second logic circuit means coupled to the means to detect and the storage means responsive to the above-mentioned second code pattern to connect a second output to the storage means to couple the coded first type of intelligence to its appropriate utilization device, a generator to produce a code sequence representing a neutral position of the code by which the first type of intelligence is conveyed, and means coupled to the means to detect responsive to the above-mentioned first code pattern to connect the generator to the second output.

Still a further feature of this invention is the provision of a Schmitt trigger to control whether the coded first type of intelligence or the coded second type of intelligence is transmitted over the communication channel in response to either the first type of intelligence directly or a coded version thereof.

The above-mentioned and other features and objects of this invention will become more apparent by reference to the following description taken in conjunction with the accompanying drawings, in which the single figure of the drawing is a schematic diagram in block form of a communication system following the principles of this invention.

Referring to the figure, PCM coder 1 has coupled thereto a plurality of sources of a first type of intelligence, such as speech source 2. Coder 1 operates to sample the speech at a predetermined interval as determined by the output of clock 3 and to produce a digital code output representing a quantized level closest to that of the amplitude of the sample. Coder 1 can be of the type that operates sequentially on a plurality of speech sources to provide a plurality of channel outputs or can include a plurality of individual coders operating simultaneously, the outputs of which are delayed to place them in time sequence. As indicated in the figure, each of the coded signals could be coupled to channel equipment identical to that illustrated in the dotted block if it is desired to interleave a second type of intelligence with the first type of intelligence of each channel. The invention will be described as it applies to the output of coder 1 representing the intelligence of source 2. The coded output representing the speech of source 2 is coupled to AND gate 4 and to a demodulator or decoder 5. The output of demodulator 5 is amplified in amplifier 6 and rectified in rectifier 7. The output of rectifier 7 is compared with a reference voltage in Schmitt trigger 8. The reference voltage of Schmitt trigger 8 will be made equal to a value which is below the lowest quantized level of coder 1. When the amplitude of the speech falls below this level it is indicative of the availability of the voice channel for the transmission of a second type of intelligence, such as data information, for instance, teletype or telemeter signals.

If the output of rectifier 7 stays above the reference level of trigger 8, the output of trigger 8 remains high. The "1" output of flip-flop 9 is also high. Thus, AND gate 4 will pass the output of coder 1 to OR gate 10, and, hence, to the mixer and transmitter 11. With an output from AND gate 4 there are no other inputs to OR gate 10.

When the talker pauses the output from rectifier 7 drops at a rate determined by the time constant in rectifier 7 and the output of trigger 8 goes low blocking AND gate 4. When the output of trigger 8 drops, AND gate 12 will provide due to the action of inverter 8*a* an output which triggers code pattern generator 13 to operate in a known manner to generate a predetermined code pattern to alert the receiving equipment to accept data characters. This pattern is sent through OR gate 10 to mixer and transmitter 11. When this pattern has been transmitted from generator 13 a reset pulse is applied to flip-flop 9 to cause the "1" output to go low and the "0" output to go high, thereby blocking gate 12 and enabling AND gates 14 and 15. The AND gate 14, when a clock pulse is present, triggers storage 16 to furnish a character to the shift register buffer 17 which then will pass the character out through gate 15 and OR gate 10.

Data characters from storage 16 and shift register 17 will be continuously sent through AND gate 15 and OR gate 10 during the lull in the conversation. When the talker resumes, the following action takes place within a few milliseconds. Rectifier 7 charges up so that trigger 8 provides a high voltage at its output. Through the action of inverter 8*a*, gate 14 is blocked to prevent more characters from being transferred to register 17. When register 17 is empty there is provided on output 18 a high voltage which is applied to AND gate 19 along with the output of trigger 8 and the "0" output of flip-flop 9. This produces an output from AND gate 19 to trigger the code pattern generator 20 to indicate to the receiving equipment that PCM voice is about to be received. When this code pattern has been passed to OR gate 10, generator 20 furnishes a set pulse to flip-flop 9 causing a high output from its "1" output and a low output from its "0" output so that gate 4 is open and the coded speech signals may flow through "OR" gate 10.

The speed of response in this system is adequate to insure recognition of the messages transmitted whether it is data or voice. There could be provided, and the speed can be increased if there is provided, a circuit coupled to the output of demodulator 5 to anticipate the idle intervals or the resumption of speech after an idle interval. To assure that no voice character is cut off before it can be completely transmitted, the Schmitt trigger 8 could be clocked, that is triggered by clock pulses from source 3 to set or reset a flip-flop. The code patterns of both generators 13 and 20 should be selected so that the code patterns do not appear in the coded voice signal or the data characters.

The signal at transmitter 11 is coupled through a suitable propagation medium 21, such as a telephone line, to a receiving equipment 22. The time shared channel output of equipment 22 is coupled to the shift register 23 with the output of the various stages in this register being sampled by a matrix 24 arranged to detect the code pattern of generator 13 or the code pattern of generator 20. During voice reception both flip-flops 25 and 26 are set, that is, they have a high output from their "1" outputs which will permit the voice coded signal at the output of register 23 to be applied through AND gate 27 to OR gate 28 and, hence, to the PCM demodulator. When matrix 24 detects the pattern of generator 13, an output on conductor 29 is present and passed through AND gate 30 at the time of the clock pulse from source 31 which is synchonized by the synchonizing signal to clock 3 in the transmitting equipment. The output from AND gate 30 causes the "0" output of flip-flop 25 to rise and the "1" output therefrom to fall, thereby preventing the passage of signals from register 23 through AND gate 27. The high signal from the "0" output of flip-flop 25 enables AND gates 32 and 33 and after a delay determined by delay line 34 passes through AND gate 35. The output from gate 35 will provide a high output at the "0" output of flip-flop 26 further enabling AND gates 32 and 33 and thereby permitting the passage of data signal from the register 23 to the data output through gate 32. At the same time gate 33 is readied during a clock pulse to pass data timing pulses to the data recovery equipment. Also, the outputs from the "0" outputs of flip-flops 25 and 26 are passed through OR gate 35 and enables AND gate 36 whose other input is coupled to a PCM coder 37. Coder 37 is preset to provide the code sequence indicative of the neutral level of the code employed to convey the speech signal. When coder 37 is energized by the output of clock 31 and AND gate 36 is enabled, the output of OR gate 28 contains a code sequence representing the neutral level of the code used to convey the speech.

When the code pattern of generator 20 is recognized by matrix 24, an output is present on conductor 39 and acts to reset flip-flop 25 to provide a high output from its "1" output which is coupled to AND gate 27. After a time delay determined by delay 40, flip-flop 26 will be reset which then will enable the coded voice signals to be coupled from register 23 to the OR gate 28 through gate 27. The act of resetting the flip-flops 25 and 26 will block AND gate 36 so that the code sequence representing the neutral level of the code is not applied to OR gate 28.

The purpose of providing the clock pulses through AND gate 33 to the data processing equipment with each bit or character is to prevent space from being taken up in the storage mechanism which are blanks or gaps in the data transmission. In other words, when the data is stopped because the voice resumes, the storage mechanism will also not be activated since there is no timing pulse output.

While I have described above the principles of my invention in connection with specific apparatus, it is to be clearly understood that this description is made only by way of example and not as a limitation to the scope of my invention as set forth in the objects thereof and in the accompanying claims.

I claim:

1. A communication system comprising:
- a communication channel for transmitting a first type of intelligence in the form of digital code groups;
- a source of code characters representing a second type of intelligence;
- means coupled to said channel to detect idle intervals in said first type of intelligence;
- means coupled to said source of code characters, said channel and said means to detect responsive to the output of said means to detect to couple said code characters to said channel during said idle intervals; and
- means coupled to said channel responsive to said code characters to control the coupling of said code groups and said code characters to appropriate utilization devices;
said source of code characters including
a source of message characters,
a first generator to produce a first predetermined code pattern to identify the beginning of said idle interval, and
a second generator to produce a second predetermined code pattern to identify the end of said idle interval.

2. A system according to claim 1, wherein said means responsive to said code characters responds to said first pattern to couple said message characters to its utilization device and to said second pattern to couple said code groups to its utilization device.

3. A communication system comprising:
a communication channel for transmitting a first type of intelligence in the form of digital code groups;
a source of code characters representing a second type of intelligence;
means coupled to said channel to detect idle intervals in said first type of intelligence;
means coupled to said source of code characters, said channel and said means to detect responsive to the output of said means to detect to couple said code characters to said channel during said idle intervals; and
means coupled to said channel responsive to said code characters to control the coupling of said code groups and said code characters to appropriate utilization devices;
said channel including
a source of said first type of intelligence;
said means to detect including
a threshold detector coupled to said source of said first type of intelligence; and
said threshold detector including
a Schmitt trigger circuit.

4. A system according to claim 3, wherein said channel further including
a coder coupled to said source of first type of intelligence to code said first type of intelligence; and
said Schmitt trigger circuit is coupled to the output of said coder.

5. A communication system comprising:
a communication channel for transmitting a first type of intelligence in the form of digital code groups;
a source of code characters representing a second type of intelligence;
means coupled to said channel to detect idle intervals in said first type of intelligence;
means coupled to said source of code characters, said channel and said means to detect responsive to the output of said means to detect to couple said code characters to said channel during said idle intervals; and
means coupled to said channel responsive to said code characters to control the coupling of said code groups and said code characters to appropriate utilization devices;
said channel including
a source of said first type of intelligence, and
a coder; and
said means to detect including
a decoder coupled to said coder,
a rectifier coupled to said decoder, and
a threshold detector coupled to said rectifier.

6. A system according to claim 5, wherein said threshold detector includes a Schmitt trigger circuit.

7. A communication system comprising:
a communication path;
a source of speech;
a digital coder coupled to said source of speech to code said speech in accordance with a given code;
a gate circuit coupled to said coder;
a digital data storage system;
a first code pattern generator producing a first predetermined code pattern;
a second code pattern generator producing a second predetermined code pattern different than said first code pattern;
a monitor coupled to said coder to provide a first control signal when the level of said speech exceeds a given level and a second control signal when the level of said speech is below a given level;
means coupling said first control signal to said first generator and said gate circuit to pass said first code pattern and the output of said coder to said path in the sequence named;
means coupling said second control signal to said first and second generators, said gate circuit and said storage system to prevent the passage of said first pattern and the output of said coder and to permit the passage of said second code pattern and said data to said path in the sequence named; and
means coupled to said path responsive to said first and second code patterns to control the coupling of said speech and said data to appropriate utilization devices.

8. A system according to claim 7, wherein
said means responsive includes
a generator to produce the neutral code sequence for said given code; and
means responsive to said second code pattern to gate said neutral code sequence to the utilization device of said speech.

9. In a communication system, a transmitter comprising:
a communication channel for transmitting a first type of intelligence in the form of digital code groups;
a source of code characters representing a second type of intelligence;
means coupled to said channel to detect idle intervals in said first type of intelligence; and
means coupled to said source of code characters, said channel and said means to detect responsive to the output of said means to detect to couple said code characters to said channel during said idle intervals;
said source of code characters including
a source of message characters,
a first generator to produce a first predetermined code pattern to identify the beginning of said idle interval, and
a second generator to produce a second predetermined code pattern to identify the end of said idle interval.

10. In a communication system, a transmitter comprising:
a communication channel for transmitting a first type of intelligence in the form of digital code groups;
a source of code characters representing a second type of intelligence;
means coupled to said channel to detect idle intervals in said first type of intelligence; and
means coupled to said source of code characters, said channel and said means to detect responsive to the output of said means to detect to couple said code characters to said channel during said idle intervals;
said channel including
a source of said first type of intelligence; and said means to detect including
a threshold detector coupled to said source of said first type of intelligence,
said threshold detector including a Schmitt trigger circuit.

11. A system according to claim 10, wherein
said channel further including a coder coupled to said source of first type of intelligence to code said first type of intelligence; and said Schmitt trigger circuit is coupled to the output of said coder.

12. In a communication system, a transmitter comprising:

a communication channel for transmitting a first type of intelligence in the form of digital code groups;

a source of code characters representing a second type of intelligence;

means coupled to said channel to detect idle intervals in said first type of intelligence; and means coupled to said source of code characters, said channel and said means to detect responsive to the output of said means to detect to couple said code characters to said channel during said idle intervals;

said channel including a source of said first type of inteligence, and a coder; and said means to detect including a decoder coupled to said coder, a rectifier coupled to said decoder, and a threshold detector coupled to said rectifier.

13. A system according to claim 12, wherein said threshold detector includes a Schmitt trigger circuit.

14. In a communication system transmitting in a single channel a composite digital signal including coded first type of intelligence, coded second type of intelligence, a first code pattern representing the start of said coded first type of intelligence and a second code pattern representing the start of said coded second type of intelligence, said coded first type of intelligence and said coded second type of intelligence being in a random relationship, a receiver comprising:

a first output for said coded first type of intelligence;

a second output for said coded second type of intelligence;

a storage means to store said composite signal;

means coupled to said storage means to detect said code patterns;

first logic circuit means coupled to said means to detect and said storage means responsive to said first code pattern to connect said first output to said storage means; and second logic circuit means coupled to said means to detect and said storage means responsive to said second code pattern to connect said second output to said storage means.

15. A system according to claim 14, further including a generator to produce a code sequence representing the neutral position of the code of said coded first type of intelligence; and means coupled to said means to detect responsive to said second code pattern to connect said generator to said first output.

16. A communication system comprising:

a communication channel for transmitting a first type of intelligence in the form of digital code groups;

a source of code characters representing a second type of intelligence;

first means coupled to said channel to detect idle intervals in said first type of intelligence and provide a first control signal indicating the start of said idle intervals and a second control signal indicating the end of said idle intervals;

second means coupled to said channel, said first means and said source of code characters to couple said first control signal, said code characters, and said second control signal to said channel in the sequence named during said idle intervals; and third means coupled to said channel responsive to first and second control signals to control the coupling of said digital code groups and said code characters to appropriate utilization devices.

17. In a communication system a transmitter comprising:

a communication channel for transmitting a first type of intelligence in the form of digital code groups;

a source of code characters representing a second type of intelligence;

first means coupled to said channel to detect idle intervals in said first type of intelligence and provide a first control signal indicating the start of said idle intervals and a second control signal indicating the end of said idle intervals; and second means coupled to said channel, said first means and said source of code characters to couple said first control signal, said code characters, and said second control signal to said channel in the sequence named during said idle intervals.

References Cited by the Examiner

UNITED STATES PATENTS

| | | | |
|---|---|---|---|
| 2,207,711 | 7/1940 | Berger et al. | 179—15 |
| 3,200,201 | 8/1965 | Runyon | 179—15 |
| 3,226,482 | 12/1965 | Wright | 179—15 |

ROBERT L. GRIFFIN, *Acting Primary Examiner.*